Jan. 21, 1941.     C. A. CADWELL     2,229,045

MATERIAL FOR USE IN WELDING

Filed Dec. 15, 1938

INVENTOR.
CHARLES A. CADWELL
BY
Oberlin, Limbach & Day
ATTORNEYS.

Patented Jan. 21, 1941

2,229,045

UNITED STATES PATENT OFFICE 2,229,045

MATERIAL FOR USE IN WELDING

Charles A. Cadwell, Cleveland Heights, Ohio, assignor to The Electric Railway Improvement Company, Cleveland, Ohio, a corporation of Ohio Application December 15, 1938, Serial No. 245,954

9 Claims. (Cl. 75—27)

As above indicated, this invention pertains to materials for use in welding and more specifically to new compositions for welding operations employing an exothermic reaction. This invention is particularly concerned with the provision of a welding material which will supply a copper weld by means of an exothermic reaction, such weld being substantially free from the serious imperfections generally encountered in copper welds so formed.

This application is a continuation in part of my co-pending application Serial No. 107,051, filed October 22, 1936.

Molten metallic copper may be obtained by an adaptation of the well-known Thermit process employing oxides of copper and powdered aluminum metal. Serious difficulties have been met with, however, in forming welds by this method as, for instance, in rail bonding, due largely to the great speed with which the reaction takes place and the excessive heat evolved. According to data given by Smithsonian tables, the heat developed by the exothermic reaction between copper oxide CuO and metallic aluminum is found to be the difference between 380 and 37.2 kilogram calories or 342.8 kilogram calories. Between $Cu_2O$ and aluminum it is the difference between 380 and 42.3 kilogram calories or 337.7 kilogram calories. Between iron oxide and aluminum it is the difference between 380 and 270.8 kilogram calories or 109.2 kilogram calories. It may be seen from the above that the copper oxide-aluminum reactions give about three times the heat of the iron Thermit reaction in common use. Such excessive heat together with the great speed of reaction renders the copper reaction extremely difficult to control.

There have been attempts in the past to reduce the violence of the reaction by incorporating some slower reacting oxide with the copper oxide and thus producing an alloy metal instead of copper alone but it has been found to be impossible to so intimately mix the ingredients of the mixture that a uniform reaction will be afforded. Instead, it is found that the reaction proceeds most rapidly where there is a more copper oxide and more slowly where there is less.

A chronic difficulty in the casting of copper is that of driving out gases from the superheated metal so that sound castings may be obtained. This difficulty is intensified in the present instance where the gases must be thrown out as they are evolved since there is an insufficient time interval during which the copper remains molten to permit their escape. Obviously, any weld requiring physical strength or good electrical contact as in rail bonding must not be highly porous.

It is, therefore, an object of this invention to provide a material for use in welding by an exothermic reaction which will supply a copper weld substantially free from the imperfections generally found in welds so formed.

Another more specific object is to provide a copper weld material for use in an exothermic reaction, which material will react more slowly than the usual copper oxide-aluminum mixture thus affording a more controllable form of reaction.

A still further object is to provide a copper weld material for use in an exothermic reaction which will supply an improved copper weld, relatively non-porous, and suitable for rail-bonding and the like.

It is also an object of this invention to provide a package or cartridge containing the new material, the ingredients being so arranged that upon ignition an exceptionally uniform result is obtained.

Other objects of this invention will appear as the description proceeds.

To the accomplishment of the foregoing and related ends, said invention, then, consists of the means hereinafter fully described and particularly pointed out in the claims; the following description setting forth in detail certain approved combinations of ingredients embodying my invention, such disclosed means constituting, however, but certain of various forms in which the principle of the invention may be used.

Broadly stated, this invention comprises a welding material comprising a mixture of copper oxide and crushed copper-aluminum alloy, the granules of said mixture preferably being coated with a thin layer of an alkali silicate.

The oxide of copper forming the principal constituent of the mixture and from which the principal volume of the resultant weld metal is derived is preferably in the form of roasted copper rolling mill scale. This metal scale is composed of flat scales of various size and varying degrees of oxidation. The finer particles are black in color which indicate a higher degree of oxidation than occurs in the larger scales of red color. It is understood, of course, that while the metal scale is desired and has been found preferable both from the standpoint of its operation as well as its cost, pure $Cu_2O$ may be employed.

The copper-aluminum alloy may contain from about 50% to about 70% copper and from about 50% to about 30% aluminum, the preferred composition being about 65% copper and about 35% aluminum. If the aluminum were simply present in granulated form without the inclusion of a regulating agent, the reaction of the same with the copper oxide in the reduction of the latter during the exothermic reaction would proceed at such a rapid rate that the mixture during the course of the reaction would with difficulty be kept in the crucible. However, the use of this crushed or finely divided copper-aluminum alloy, instead of granulated aluminum as the reducing agent, reduces the violence of the reaction and adds volume to the molten copper resulting from the exothermic reaction while permitting the reaction to proceed at a sufficient rate to maintain the proper temperature necessary for the production of the molten welding metal. In other words, sufficient copper as metal is included to absorb a substantial amount of the heat generated by the reaction.

In the preferred form of my invention the welding material will contain about 40 parts by weight of roasted copper scale and 17 parts of the copper-aluminum alloy although the copper scale may vary from about 30 to about 50 parts and the alloy from about 14 to about 20 parts.

A table giving the composition and proportions of such a mixture is as follows:

| | Parts by weight |
|---|---|
| Copper oxide (roasted copper mill scale) | from about 30 to about 50 |
| Copper-aluminum alloy | from about 14 to about 20 |
| Tin oxide | from about .75 to about 2 |
| Manganese dioxide | from about .4 to about 1 |

In the foregoing table it should be noted that the tin oxide, the zinc oxide and the manganese dioxide are all added in accordance with the usual principles under which these elements are added to insure a soundness of the weld metal. Obviously, their proportional relationship may be changed if found necessary under particular conditions in order to increase the soundness of the metal.

A specific example of a mixture found very satisfactory for use in accordance with my invention is as follows:

| | | |
|---|---|---|
| Copper mill scale | grams | 45 |
| Copper-aluminum alloy | do | 17.5 |
| Tin oxide | do | 1 |
| Zinc oxide | do | ½ |
| Red phosphorus | milligrams | 200 |
| Metallic manganese | do | 200 |

The copper mill scale, as well as the copper-aluminum alloy will preferably be in such finely divided form as will pass through a 28 mesh screen and be retained on a 100 mesh screen. The metallic manganese will be of such a fineness as will pass through an 80 mesh screen.

I have further found that the gases ordinarily formed in the weld metal may be substantially dissipated by coating the copper scale and copper-aluminum alloy with a thin film of an alkali silicate such as sodium silicate. The following is a brief résumé of one method of applying this film: To 40 parts of roasted copper scale and 17 parts of the 65–35 copper-aluminum alloy is added from about 1 to 2% of a 41° Baumé solution of sodium silicate in which the ratio of alkali to silica is about 1 to 3.2. Sufficient water is added to cover and the mixture is then evaporated, the heating being continued up to a red heat when all combined water is driven off. Upon cooling the material is ready for use.

The foregoing mixture does not ignite very readily, so that it is desirable to employ in conjunction with each charge a small quantity of an igniting powder which may be conveniently placed on top of the charge ignited with a match and which may, for example, contain the following:

| | Parts by weight |
|---|---|
| Copper oxide scale | 20 |
| Copper-aluminum alloy | 5 |
| Red phosphorus | 5 |
| Metallic aluminum powder | 7.5 |
| Black copper oxide | 10 |

The exothermic charge may be poured into the crucible and compacted to induce speed and uniform spread of the reaction with a small amount of the ignition powder placed on top of the same and then fired with a match. It will be found, however, that when the charges are carefully weighed out and packaged, that not only will time be saved in the field but there will be greater assurance that exactly the amount of the charge will be employed as is required to produce the amount of weld metal necessary to properly fill the mold cavity.

In the annexed drawing—

Figure 1:
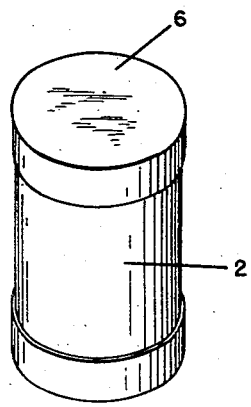
Fig. 1 is a perspective view of the cartridge of this invention.
Figure 2:
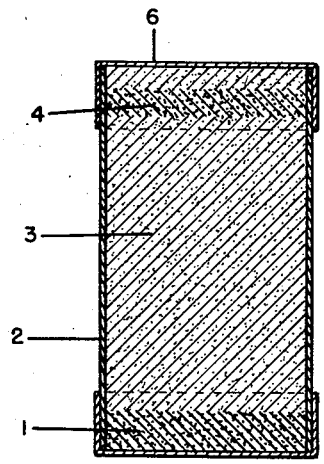
Fig. 2 is a cross-sectional view of the same cartridge indicating the disposition of its contents.
Figure 3:
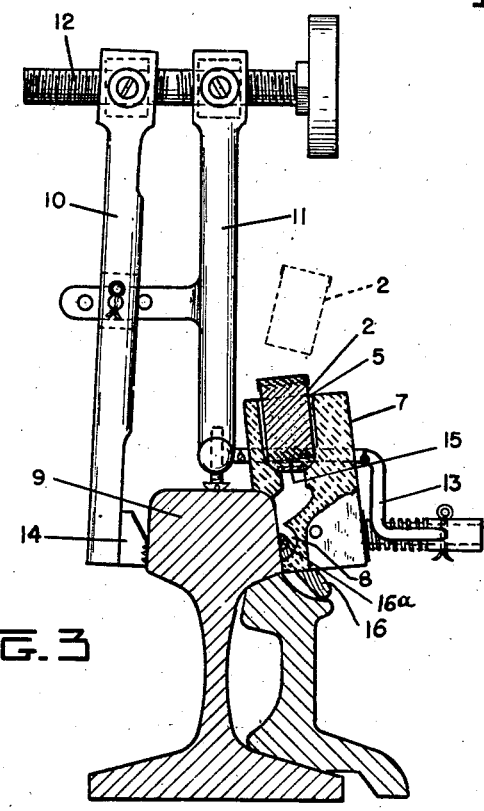
Fig. 3 is a side elevational view, partly in cross-section, illustrating the manner in which the crucible of a rail bonding apparatus may be charged.

A very convenient and effective package or cartridge may be made as shown in Figs. 1 and 2 of the attached drawing by placing a small amount of igniting powder 1 in the bottom of a cylindrical cardboard container 2 and then filling the remainder of the container with the new exothermic charge 3 of this invention, a small amount of an oxide mixture 4 being added near the top. When filling a crucible 5 the cap 6 is removed from the above described cartridge and the cartridge is quickly inverted into the crucible as shown in Fig. 3. Upon being withdrawn as indicated in dotted line it leaves the charge in the crucible, the oxide mixture at the bottom adjacent the plug and the igniting powder at the top ready to be ignited.

The rail bonding apparatus illustrated in Fig. 3 is disclosed and claimed in my co-pending application Ser. No. 243,351. Briefly, it comprises a mold and crucible block 7 in which the crucible 5 and mold cavity 8 are hollowed. The open face of the mold cavity is clamped against the railhead 9 by means of two vertically disposed arms 10 and 11 pivotally connected intermediately of their ends with screw means 12 operative to draw the upper ends of said arms together or move them apart. A frame 13, comprising two arms, one being shown broken away, supports said mold and crucible block 7 and is itself attached to the arm 11 whereby said block may be tightly held against the rail-head in clamping cooperation with the foot 14 of the arm 10. A metal slug or plug 15 in the bottom of the crucible prevents the welding material from dropping down into the mold prior to reaction. As shown in Fig. 3, a cartridge has been inserted in the crucible after first removing the cap and will be withdrawn as indicated in dotted line leaving its contents in the crucible as above described. A bond 16 is also shown in place with its terminal 16a inserted in mold cavity 8 ready to be welded to the adjacent face of the rail head 9.

Upon applying a match the reaction is very rapid as far down as the oxide mixture which retards the progress of the reaction for an instant and allows the molten copper to form a pool which then passes through the metal slug as a unit mass of perfect metal. In this way a moment of time is obtained wherein the whole charge may completely react and most of the gases escape before the molten metal drops into the mold cavity. As would be expected, the resultant weld is more perfect and uniform, being formed from a more perfect charge of metal.

An example of a charge found very satisfactory for use in cartridges of this type is the following:

| | Pounds |
|---|---|
| Roasted copper scale | 14.4 |
| 65-35 Cu-Al alloy—crushed | 5.6 |
| Tin oxide | .1 |
| Zinc oxide | .1 |
| Ferro zirconium | .1 |
| Total | 20.3 |

This mixture is wetted with 60 c. c. of sodium silicate in a quart of water and placed over a fire. It is heated to a dull red heat, stirring occasionally, for a period of about eight hours, in order to expel all moisture. The sodium silicate aids in cementing the finer particles together to form a granular structure. 20.3 pounds of this powder are sufficient to load 512 cartridges of the size employed in welding the ordinary signal bond conductors. In order to obtain uniform results it is very important that the various ingredients be thoroughly mixed and then measured out by means of a sampler which will insure an even distribution of each ingredient. It will be noted that this charge contains a slight excess of aluminum for the purpose of reacting with the oxide mixture used to delay the passage of the molten metal through the slug.

This oxide mixture will advantageously comprise:

| | Parts |
|---|---|
| Tin oxide | 1 |
| Zinc oxide | 1 |
| Ferro zirconium | 1 |
| Fine black copper oxide | 5 |

The retarding effect of this finely powdered mixture of oxides is such that if it were scattered through the charge the reaction would be very uneven and the slug broken through before all portions of the mixture had reacted.

By employing cartridges of the type described above uniform welds may be insured and a considerable saving in time obtained over the method requiring the welder to measure out each charge on the spot.

The material of this invention has been found to be of particular value in joining bonds to rails, as, for instance, copper bonds to steel rails, and, of course, it may be employed in bonding the stranded conductor to a steel plate or similar terminal member, which terminal member may then be secured by any suitable means to the steel rail.

My invention may also be utilized in many other applications where a copper weld may be desired, such as, for example, in bonding the blades to the base in an ordinary electric knife switch.

Part of the subject matter disclosed and claimed in this application is disclosed but not claimed in my copending application Serial No. 243,394, filed Dec. 1, 1938.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:

1. A welding material for use in an exothermic reaction comprising a mixture of copper oxide and a crushed copper-aluminum alloy, the granules of said mixture being coated with a thin film of an alkali silicate.

2. A welding material for use in an exothermic reaction comprising a mixture of about 40 parts roasted copper scale and about 17 parts of a crushed alloy of copper and aluminum in substantially a 65/35 ratio, the granules of said mixture being coated with a thin film of sodium silicate in which the ratio of alkali to silica is about 1 to 3.

3. As a composition of matter for use in welding by means of an exothermic reaction comprising:

| | Parts by weight |
|---|---|
| Copper oxide | about 45 |
| Copper-aluminum alloy (65% Cu, 35% Al) | about 17.5 |
| Tin oxide | about 1 |
| Zinc oxide | about .5 | and including an appropriate igniting component.

4. A package of material for use in an exothermic reaction comprising a container and an exothermic charge therein including the following ingredients:

| | Parts |
|---|---|
| Roasted copper scale | 14.4 |
| 65-35 Cu-Al alloy—crushed | 5.6 |
| Tin oxide | .1 |
| Zinc oxide | .1 |
| Ferro zirconium | .1 | a small amount of an igniting powder at one end, and a layer of an oxide composition comprising:

| | Parts |
|---|---|
| Tin oxide | 1 |
| Zinc oxide | 1 |
| Ferro zirconium | 1 |
| Fine black copper oxide | 5 | at the other end of the package.

5. Welding material for use in an exothermic reaction comprising a mixture of finely divided copper oxide and aluminum, the latter having sufficient copper alloyed therewith to absorb a substantial amount of the heat generated by the reaction.

6. Welding material for use in an exothermic reaction comprising a mixture of finely divided copper oxide and aluminum together with copper as metal in a ratio of approximately 35% of aluminum to 65% of copper.

7. Welding material for use in an exothermic reaction comprising a mixture of about 40 parts of copper oxide and about 17 parts of aluminum including sufficient copper as metal to absorb a substantial amount of the heat generated by the reaction, all being finely divided.

8. Welding material for use in an exothermic reaction comprising a mixture of about 40 parts of copper oxide and about 17 parts of aluminum including copper alloyed therewith in amount at least equal to the amount of aluminum, all being finely divided.

9. A package of material for use in exothermic welding, comprising a charge of alumino-thermic reaction material in an elongated container, a small amount of igniting powder for such material at one end, and a layer of reaction-retarding material at the other end, the latter end of said container being openable for emptying its contents into a crucible or the like, whereby proper distribution of such contents for the reaction is insured.

CHARLES A. CADWELL.